United States Patent [19]

Allen

[11] Patent Number: 5,323,479
[45] Date of Patent: Jun. 21, 1994

[54] PACKAGE FOR FIBER OPTIC CABLE

[75] Inventor: Robert L. Allen, Centereach, N.Y.

[73] Assignee: Porta Systems Corp., Syosset, N.Y.

[21] Appl. No.: 77,376

[22] Filed: Jun. 17, 1993

[51] Int. Cl.⁵ .............................................. G02B 6/44
[52] U.S. Cl. .......................................................... 385/135
[58] Field of Search ............... 385/134, 135, 136, 137, 385/138, 139, 147

[56] References Cited

U.S. PATENT DOCUMENTS

| | | | |
|---|---|---|---|
| 4,502,754 | 3/1985 | Kawa | 385/135 X |
| 4,630,886 | 12/1986 | Lauriello et al. | 385/135 |
| 4,846,343 | 7/1989 | Rupert | 385/135 X |
| 5,142,607 | 8/1992 | Petrotta et al. | 385/135 |
| 5,241,617 | 8/1993 | Peacock et al. | 385/135 |

*Primary Examiner*—Akm E. Ullah
*Attorney, Agent, or Firm*—Charles E. Temko

[57] ABSTRACT

A specialized package for shipping and using fiber optic cable which simplifies handling prior to installation, and serves as a storage device after the cable has been installed. The disclosed device comprises a fiber board box of planar configuration with an integral lid secured in closed position by tuck tabs. Positioned within the box are a pair of planar foam layers each defining a congruent circular opening. Positioned within the opening is a flat spool having a core and at least one detachable end cap upon which the fiber optic cable is coiled, and from which project a pair of connectorized ends. When the package is closed, the connectorized ends are gently clamped between the foam layers, thus protecting the same against damage during shipment.

7 Claims, 1 Drawing Sheet

PACKAGE FOR FIBER OPTIC CABLE

BACKGROUND OF THE INVENTION

This invention relates generally to the field of fiber optic cables, and more particularly to an improved means and method for packaging and storing such cable to eliminate the possible damage resulting from excessive handling of the same prior to ultimate installation.

As purchased from cable manufacturers, optical cable is installed on very large spools holding integral lengths of cables, often measuring many hundreds of meters. This large length is subsequently cut to smaller standardized lengths of cable ranging in length between 10 and 25 meters, and connectorized at each end for use in telephone central offices and similar locations where a connectorized cable is employed to stand a distance normally substantially smaller than the length of the cable. The excess cable is wound in a coil of diameter greater than the minimum bend radius and stored in a cabinet drawer or other suitable protected location, since it is desirable for technical reasons to have as few joints in the cable as possible.

As contrasted with copper wire and cables comprised of copper wire, fiber optic cable is quite fragile and easily damaged if improperly handled. Thus, there arises a need to protect the fiber after it has been cut to standardized length and fitted with connectors.

SUMMARY OF THE INVENTION

Briefly stated, the invention contemplates the provision of an improved package for storing shorter lengths of fiber optic cable which package serves not only as a container for shipment, but as a means for permanent storage of excess cable length after installation. To this end, the device comprises a generally planar fiber board box having an integral lid which defines a rectangularly shaped recess. Fitted within the recess is a pair of planar foam insert units of corresponding rectangular dimensions, each defining a through-circular congruent opening. Selectively positioned within the opening is a flanged spool, the flanges of which are detachable to permit removal of a coil of fiber without unwinding the same. When a connectorized length of cable is wound on the spool, the connectorized ends are allowed to project outwardly of the flanges to be sandwiched between the foam layers when the package is closed. When the cable is installed, the coiled medial segment may be allowed to remain on the spool and thus protect it from further handling and possible damage. Alternatively, one of the flanges of the spool may be removed and the coil may be manually separated from the spool if a cable drawer or other storage location is available.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
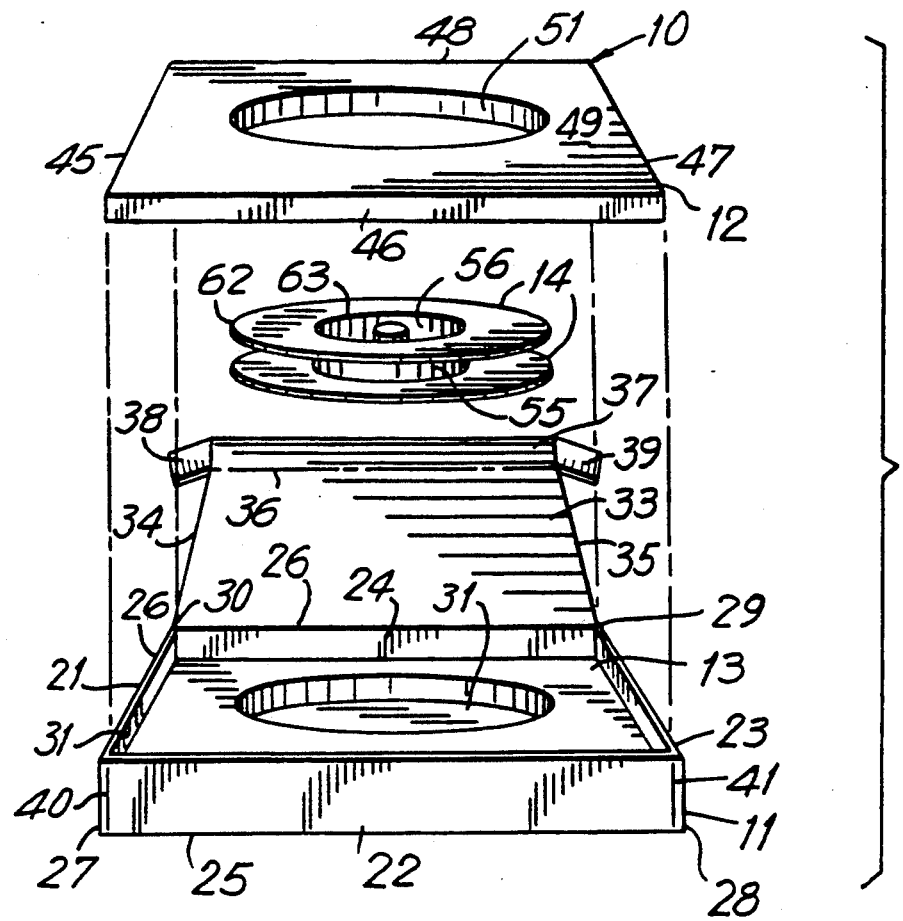
FIG. 1 is an exploded view in perspective of an embodiment of the invention.
Figure 2:
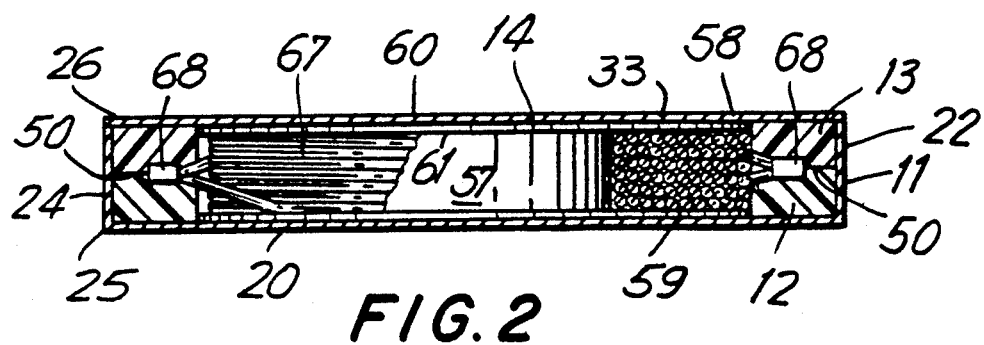
FIG. 2 is a transverse sectional view of the embodiment in closed condition.

In accordance with the invention, the device, generally indicated by reference character 10, comprises broadly: a box element 11, a first foam insert member 12, a second foam insert member 13, and a spool element 14.

The box element 11 is of generally conventional construction, and may be formed, for example, from flute corrugated board. It includes a bottom wall 20, first, second, third, and fourth side walls 21, 22, 23, and 24, which form a continuous lower edge 25 and a continuous upper edge 26. The walls are interconnected at corners 27, 28, 29, and 30 to define a generally planar rectangular recess 31. An upper wall or lid 33 is foldably interconnected to a portion of the upper edge 26 and is bounded by side edges 34 and 35 and a fold edge 36 which interconnects with an overlapping free end wall 37 having laterally extending tuck tabs 38 and 39 engageable within slotted openings 40 and 41, respectively.

The foam insert members 12 and 13 are substantially identical, and accordingly, interchangeable. They are formed of known semi-flexible porous resinous synthetic materials commercially available in large sheets, from which they may be cut to standard dimension. Each is bounded by side edge surfaces 45, 46, 47, 48, as well as an upper surface 49 and a lower surface 50. Medially positioned is a circular through opening 51. The spool element 14 may be of either metal or fibrous construction, and includes a central core 55 having a through opening 56 and bounded by an outer surface 57 upon which cable might be wound. Either or both end flanges 58 and 59 are detachably engageable and may be either resiliently or frictionally maintained in any known manner. Each of the flanges 58-59 is bounded by outer and inner surfaces 60 and 61 as well as outer and inner peripheral edges 62 and 63.

In use, the spool element 14 is wound with a standardized length of fiber optic cable 67 having oppositely disposed ends engaged with a standard fiber optic connector 68. The ends of the cable are attached prior or after the winding, and are allowed to project outwardly of the outer edge 62 of the flanges.

The spool is then positioned in the opening in the lower foam insert, and the upper foam insert is then positioned to result in the connectors 68 being gently clamped between the surfaces of the abutting foam insert members. The lid is then closed, and the device is ready for shipment.

Upon arrival at a destination, the box element is opened at the time of installation of the cable, and the upper foam insert is removed to expose the spool element. The uppermost flange element 58 may then be removed to prevent removal of the cable as an entire coil without the need to unwind the same from the spool. After engaging the connectors, the coil may be stored in well-known manner.

Where no cable drawer is conveniently located, the user has the option of unwinding as much of the coil as is required for installation, allowing the remainder of the coil to remain on the spool which serves as a storage unit. The box element and foam elements may then be discarded or recycled.

Most conveniently, the box element is dimensioned to a height of about 1-⅛ inches, with the sides forming a recess about 8 inches square. The foam insert members are preferably 9/16 inches thick in uncompressed state, so that when the box element is closed, the inserts provide a light compressive force upon the connector 68 positioned therebetween.

It may thus be seen that I have presented novel and highly useful improvements in packaging for connectorized fiber optic cables, in which it is possible to wind fiber directly from a main rail onto a shipping spool, thus eliminating the dangers of excess handling of the fiber optic cable. The modular format of the contained spool reduces handling time and risk of further damage from handling of the fiber during the process of interconnecting the connector elements at each end of the fiber. Additionally, the need to rewind the fiber to a different diameter for shipping purposes is eliminated, since the fiber is already on its shipping medium throughout the entire assembly process. Orientation or location of the breakout of the ends of the cable from the spool is no longer a concern, since the connector ends are sandwiched between two layers of protective foam regardless of the breakout location.

I wish it to be understood that I do not consider the invention to be limited to the precise details of structure shown and set forth in the specification, for obvious modifications will occur to those skilled in the art to which the invention pertains.

I claim:

1. A device for packaging short lengths of fiber optic cable having connectorized ends comprising: a generally planar box element having a bottom wall, at least one side wall defining a planar recess above said bottom wall, and a selectively closeable lid; a first compressible insert corresponding in overall configuration to that of said recess, and positioned to overlie said bottom wall, said first insert having a thickness approximating one-half depth of said recess; a second compressible insert substantially identical to said first compressible insert, and positioned within said recess to overlie said first insert in congruent relation; each of said units defining a circular through opening to form a second recess therein; and a spool element having a central core and first and second end flanges, at least one of said flanges being selectively detachable from said core.

2. A device in accordance with claim 1, in which said compressible inserts are of synthetic resinous foam material.

3. A device in accordance with claim 1, in which said lid is hingedly interconnected along an edge thereof to said at least one side wall.

4. A device in accordance with claim 1, in which said planar box element is of rectangular configuration.

5. A method of packaging lengths of connectorized fiber optic cables comprising the steps of:
   a) providing a generally planar closeable container defining a corresponding planar recess therein above a bottom wall thereof;
   b) providing first and second planar compressible inserts, each of thickness corresponding to substantially one-half the depth of said recess, and in which each of said inserts defines a medially positioned circular through opening;
   c) providing a flanged spool of width corresponding to the depth of said recess in which at least one flange thereof is relatively detachable;
   d) winding said connectorized cable upon said flange spool to form a coil such that the ends of said cable project outwardly of the outer edges of the flanges thereof;
   e) positioning one of said inserts within said cavity to overlie the inner surface of said bottom wall;
   f) positioning said spool with said cable thereon within said opening in said insert with the connectorized ends of said cable overlying an upper surface of said one of said inserts;
   g) positioning the other of said inserts to overlie said one of said inserts and partially surround said spool, and sandwich the connectorized ends of said cable between surfaces of said first and second inserts; and
   h) closing said container.

6. In the method set forth in claim 5, the additional steps of:
   i) opening said container to expose said spool;
   j) removing the exposed flange of the spool; and
   k) removing said coil of cable from said spool without unwinding the same.

7. In the method of claim 6, the additional steps of:
   l) opening said container to expose said spool;
   m) removing said spool from said container; and
   n) unwinding said coil from said spool to the extent necessary to install said cable while allowing the excess length of said cable to remain in coiled condition upon said spool.

* * * * *